United States Patent [19]

Himes, Jr. et al.

[11] Patent Number: 4,925,392
[45] Date of Patent: May 15, 1990

[54] ELECTRICAL CONNECTORS FOR FLEXIBLE BUSSING SYSTEM

[75] Inventors: John L. Himes, Jr., Hummelstown; James H. Wise, Palmyra, both of Pa.

[73] Assignee: AMP Incorporated, Harrisburg, Pa.

[21] Appl. No.: 313,217

[22] Filed: Feb. 21, 1989

Related U.S. Application Data

[62] Division of Ser. No. 90,297, Aug. 31, 1987, Pat. No. 4,845,592.

[51] Int. Cl.$^5$ .......................................... H01R 13/00
[52] U.S. Cl. ......................................................... 439/55
[58] Field of Search ............................... 439/55, 59–62, 439/67, 77, 92, 101, 108; 361/407; 174/72 B

[56] References Cited

U.S. PATENT DOCUMENTS

| | | | |
|---|---|---|---|
| 3,368,117 | 2/1968 | Pond et al. | 361/407 |
| 3,448,345 | 6/1969 | Koehler, Jr. | 361/407 |
| 3,725,843 | 4/1973 | Johnson | 439/64 |
| 3,796,986 | 3/1974 | Tamburro | 439/329 |
| 4,655,518 | 4/1987 | Johnson . | |
| 4,790,760 | 12/1988 | Kreinberg | 439/55 |

Primary Examiner—Joseph H. McGlynn
Attorney, Agent, or Firm—Katherine A. Nelson

[57] ABSTRACT

A bussing system 10 for panels 11 such as a printed circuit boards, employs bus means comprised of at least one ribbon 16 of flexible, relatively thin, substantially flat, conductive material, such as copper. Ribbon 16 is bent as desired to be received within a plurality of taps, including at least one vertical tap 13, mounted on the panel at selected respective locations. The taps may also include at least one horizontal tap 14, in which case ribbon 16 is twisted to right angles thereto to be received in the horizontal tap. One or more standoffs 15 may be employed to maintain mechanical rigidity and to maintain ribbon 16 in a vertical orientation off of panel 11. The amount of copper (or other material) employed is held to a minimum to meet the circular mil area (or "CMA") requirements. Design flexibility is assured for accommodating a variety of configurations, thereby effecting a considerable savings in development, tooling and production costs.

15 Claims, 18 Drawing Sheets

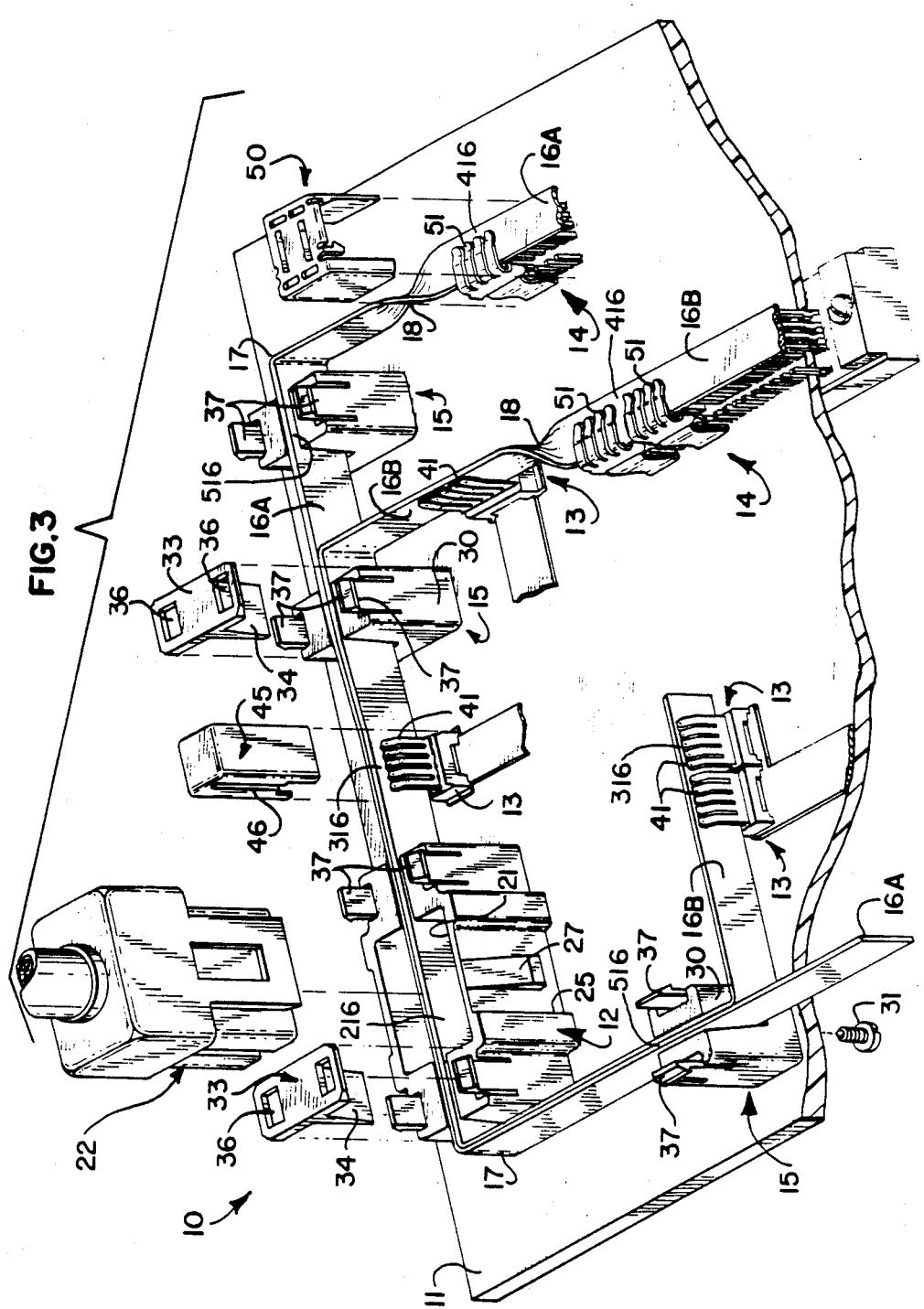

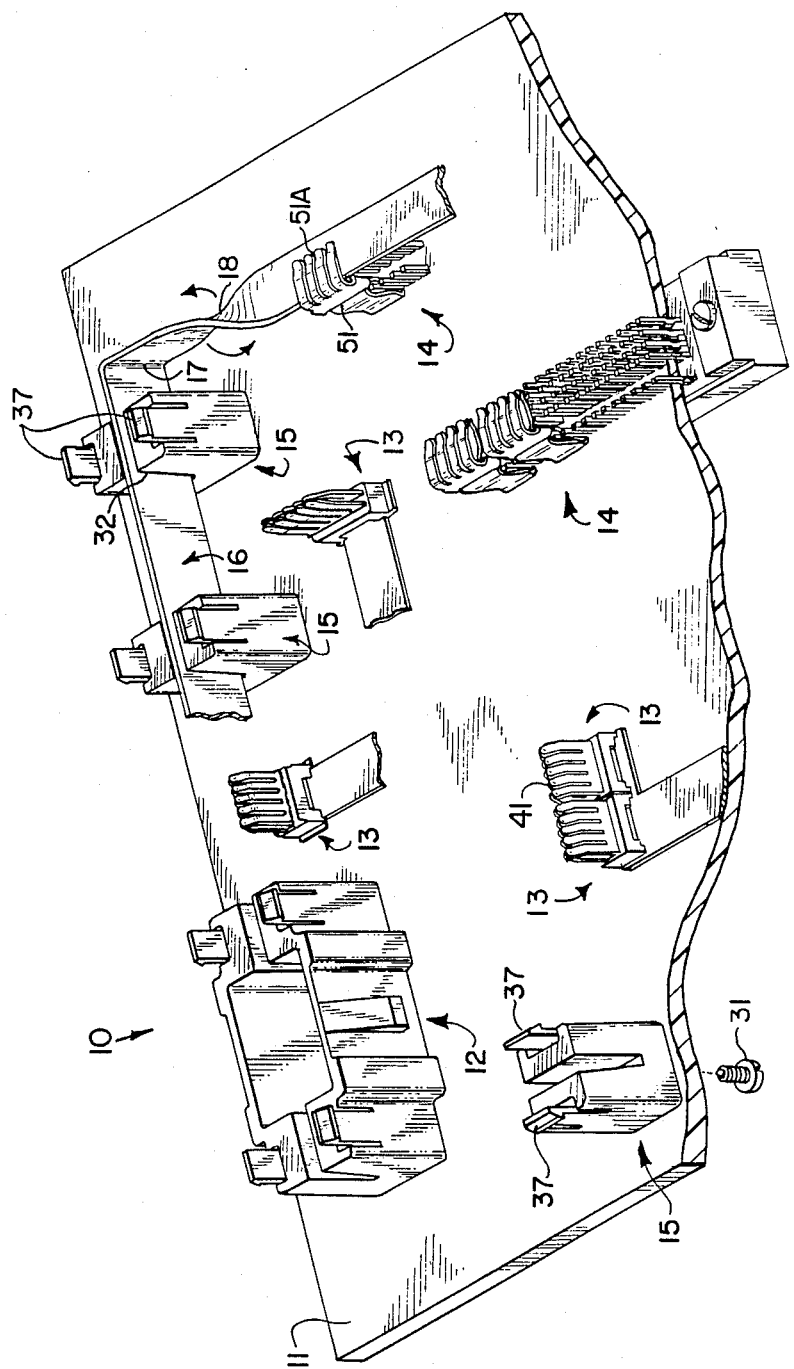

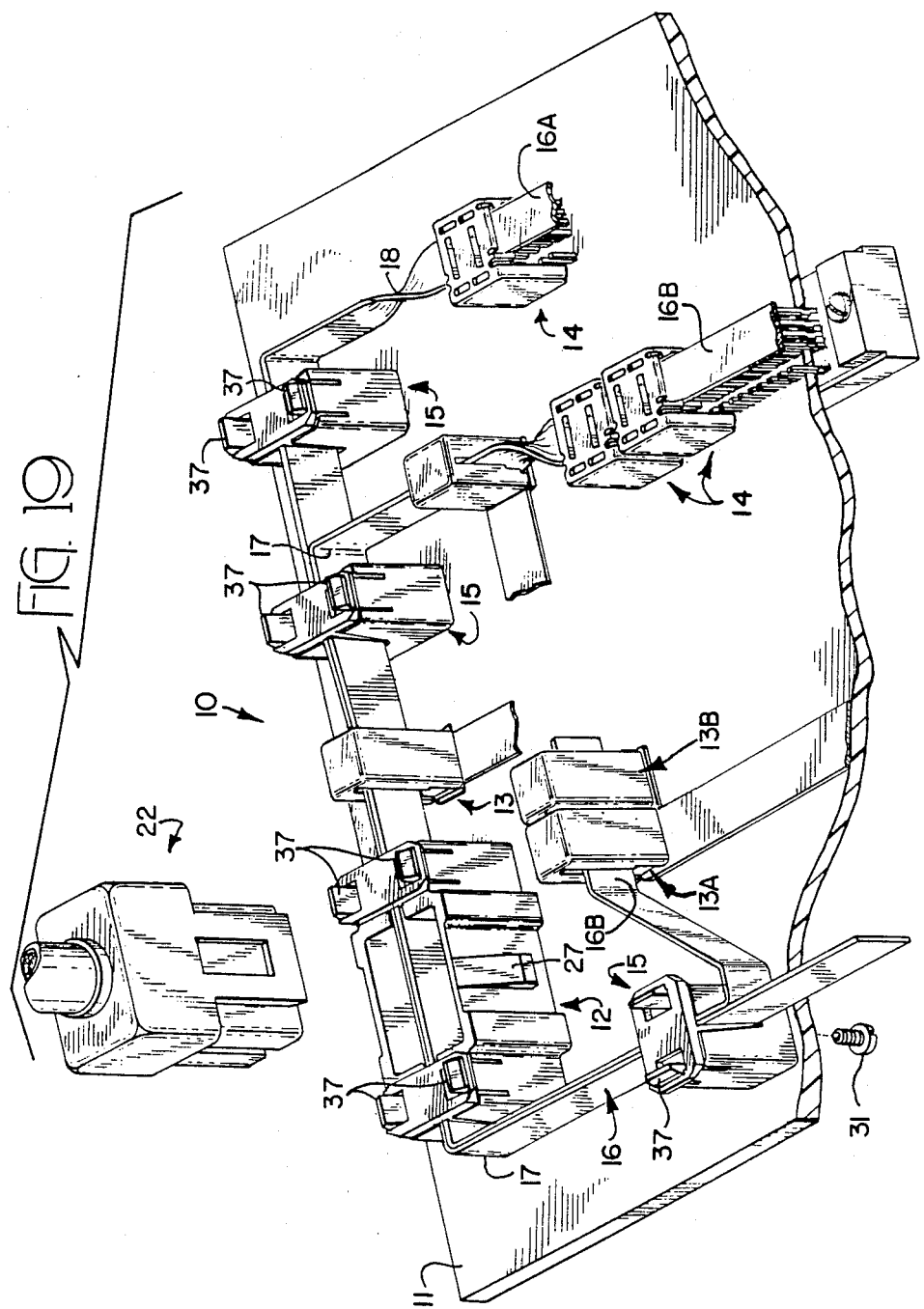

ELECTRICAL CONNECTORS FOR FLEXIBLE BUSSING SYSTEM

This is a divisional application of Application Ser. No. 07/909,297 filed Aug. 31, 1987, now U.S. Pat. No. 4,845,592.

FIELD OF THE INVENTION

The present invention relates to a bussing system for distributing power to printed circuit boards, backplanes or the like and, more particularly, to a flexible bussing system adapted to bring in power from an electrical supply source and distribute the power to one or more adjacent printed circuit boards.

BACKGROUND OF THE INVENTION

Electronic equipment, and more particularly computers, have a backplane constituting a "mother" board for bringing in electrical power and distributing the power to a plurality of stacked printed circuit boards constituting "daughter" boards having the logic circuitry thereon.

In the prior art, the backplane bussing arrangements rely upon copper bus bars deposited thereon. These bus bars have a fixed cross section and are sized to carry the maximum electrical current present anywhere in the bar. These bars are rigid and therefore require fixed straight paths, and the bars are bolted to the printed circuit ("PC") board in order to facilitate the entry of current into the PC board.

An example of the prior art is illustrated in U.S. Pat. No. 4,241,381 issued to Cobaugh et al., and assigned to the assignee of the present invention. In this '381 patent, the PC board is first defined, and then the designer decides where the current should be fed into the PC board. Thereafter, a coordinated grid constituting a rigid structure is laid down (by photo-etching or other depositing means) to overlay each hole in the PC board with a given tolerance therein. The grid must be sized for the total current going into the PC board (for the required circular mil area or ("CMA") and thus the same ("massive") amount of copper is used everywhere. After soldering, holes are drilled into the rigid grid structure to coincide with the plurality of holes in the PC board, thus requiring that the respective holes be located at relatively "tight" tolerances during the manufacturing operations. Bolts are run through the aligned holes, and the bolts are tightened to the desired torque.

The bolted connections often become loose after the equipment has been operated out in the field, owing to a number of environmental factors, and internal losses due to increased resistance are encountered in the system. With these systems, changes in the electrical resistance (even in the micro-ohm range) can equate into significant losses and result in erratic operation of the logic circuitry in the equipment. Accordingly, periodic re-tightening or re-torquing of the bolts is required, and this is an annoying service problem.

Additional prior art is listed herein as follows:

| Inventor(s) | Pat. No. |
| --- | --- |
| Pond et al. | 3,368,117 |
| Lynch | 3,701,078 |
| Johnson | 3,725,843 |
| Douty et al. | 4,405,189 |
| Richard et al. | 4,472,764 |

-continued

| Inventor(s) | Pat. No. |
| --- | --- |
| Great Britain | 2110-463-B |

In Pond et al. '117, a voltage distribution system is disclosed, wherein the bus bar runs only from the power supply. Only a single bend of the bus bar is employed, and the bend is external to the board. Thus there is no flexibility provided for multiple bus bars directly on the board.

In Lynch '078, a holder is disclosed which operates simultaneously as a bussing connector for discrete electrical circuit paths on opposed sides of a substrate. This is not a power distribution system, however.

Johnson '843 discloses bussing connections for printed circuit connectors. However, the bussing is always above the board, never below the board, and the bussing is never bent or twisted; thus insufficient flexibility is provided.

Douty et al. '189 discloses a power distribution block for supplying bussed power to a circuit board, but merely discloses a high-current contact and not a system of flexible busses for adjacent PC boards.

Richard et al. '764 has a terminal block for PC boards and merely discloses a plurality of parallel bus bars without inherent flexibility to accommodate a plurality of configurations.

Great Britain '463-B discloses a flexible bar with a capacitor therebetween.

While these prior art teachings are interesting, nevertheless they have certain disadvantages or deficiencies which detract from their utility and flexibility; and thus their teachings are not adaptable to an improved system for distributing power to a plurality of PC boards.

SUMMARY OF THE INVENTION

Accordingly, it is an object of the present invention to alleviate the disadvantages and deficiencies of the prior art by providing a bussing system for distributing power to PC boards, wherein the system is sufficiently flexible to accommodate a variety of desired configurations.

It is another object of the present invention to provide a bussing system having inherent flexibility so that the power may be distributed where it is desired, thereby facilitating the building of prototypes, substantially reducing the cost of development and tooling, and saving considerable time and material.

It is yet another object of the present invention to provide a bussing system having a variable circular mil area ("CMA") feature, thereby effecting a considerable savings of the "massive" amounts of copper heretofore required in the prior art.

It is a further object of the present invention to substantially eliminate the problems inherent in close manufacturing tolerances, thereby achieving a more cost-effective system.

It is a still further object of the present invention to eliminate the bolted connections heretofore resorted to in the prior art, thereby substantially reducing field service problems on computer equipment.

It is a still further object of the present invention to provide a plurality of standardized modules in a design "kit" for use by engineers.

In accordance with the teachings of the present invention, there is herein illustrated and described a bussing system for distributing power to panels such as printed circuit boards, backplanes or the like employed in electronic equipment, wherein the system brings in power from an electrical supply source and distributes the power to one or more adjacent printed circuit boards. The bussing system of the present invention includes a panel having a selected major surface, an input connection means comprising a first, member mounted on the selected panel surface and a second member secured to an electrical cable connected to electrical supply source. A plurality of taps is secured to the selected panel surface at respective selected locations. Each of the taps has respective electrical contact means therein, and means are provided for making respective electrical connections from the contact means in the respective taps to respective portions of the adjacent printed circuit boards. A flexible bussing means including at least one ribbon of flexible conductive material is connected to the input connection means. The ribbon is bent as desired and is received within the respective taps so as to make electrical connection with the respective electrical contact means therein, thereby accommodating current carrying capacity at any given location on the board without requiring additional conductive material beyond that which is necessary to carry the desired current, and thereby facilitating a substantially improved degree of flexibility for accommodating the distribution of the electrical power to the adjacent printed circuit boards.

Preferably, the means for making electrical connections from the contact means in the respective taps to respective portions of the adjacent printed circuit boards includes plug-in terminals, thereby eliminating the traditional bolt-type of electrical connections, and thereby further eliminating the necessity for re-torquing the bolted connections at repeated intervals in servicing the equipment.

In a preferred embodiment, a plurality of ribbons is employed, and the ribbons are superimposed upon one another in side-by-side relationship at least at the first member of the input connection means on the board, thereby forming a stack of ribbons. At least one of the ribbons is separated from the stack of ribbons, as desired, and is bent for reception in the respective taps. The bus bar ribbons are relatively thin and substantially flat, and may be bent into substantially mutually perpendicular planes. The conductive material of the ribbons comprises copper or copper alloy, which may be used unplated or plated with tin or silver as desired.

In an alternate embodiment, respective insulation means separates the ribbons within the stack of ribbons, whereby a plurality of different voltages may be brought into the input connection means and flexibly distributed.

The modular taps on the board include at least one vertical tap having an insulated base, and the electrical contact means comprises a contact carried by the base, the contact having respective portions extending above and below the base. The portion extending above the base includes respective pairs of resiliently-biased contact members disposed in a parallel stacked relationship with each other and defining therebetween a contact plane comprising a slot for receiving at least one of the ribbons, whereby the ribbon makes an electrical connection with the contact in the vertical tap.

Each of the respective portions of the contact extending below the base is preferably formed as a compliant pin, such as the one disclosed in U.S. Pat. No. 4,186,192, wherein a section of the pin is sheared or split to form a pair of offset legs Which fit into and grip the walls of holes, whereby the vertical tap or other component is anchored on the board. It is to be understood that other means and other types of contacts, such as those having solder posts, may also be used to electrically connect and anchor components to the board.

A cover is received on the base of the vertical tap and encloses the electrical contact means and the ribbon therein, the cover being adapted to be received over the base and snapped in place.

The taps of the presently preferred embodiment further include at least one horizontal tap having at least one contact therein provided with a portion thereof bent substantially at right angles thereto so as to be substantially parallel to the board when the horizontal tap is mounted on the board. A plurality of posts is anchored in respective sleeves in a plurality of complementary holes on the board, and a retention spring locks the posts to the contact. A cover is fitted over the contact, and the cover includes latch means for locking the ribbon and the contact together. It is to be understood that any combination of vertical and/or horizontal taps may be used in accordance with the invention.

Preferably, at least one vertical or horizontal standoff is provided, the standoffs being adapted to hold the ribbon in either a vertical or horizontal attitude and at a distance off of the board, thereby providing mechanical stability to the bussing system. The vertical standoff includes a housing secured to the board, and the housing has a tapered slot formed therein for receiving the ribbon. A clamp has a depending wedge adapted to be received in the slot in the housing and to be lodged against the ribbon, thereby retaining the ribbon in the slot. The clamp has a top portion provided with a pair of spaced-apart openings therein, and the housing has a pair of complementary spaced-apart outwardly resiliently-biased fingers adapted to be received in the respective pair of openings in the top portion of the clamp. Each of the fingers has an outwardly-extending hook portion adapted to be received through its respective opening and to be lodged over the top portion of the clamp, thereby retaining the clamp on the housing. With this structure, the resiliently-biased fingers may be squeezed together to clear the hooks thereof through the respective openings in the top portion of the clamp, thereby allowing the clamp to be removed from the housing.

Additionally, the slot in the housing of the vertical standoff may accommodate a plurality of ribbons, in which case a second clamp is substituted for the clamp. This second clamp has a top portion substantially identical to the top portion of the clamp, and the second clamp further has a wedge which is thinner than the wedge of the clamp.

The horizontal standoff includes a housing secured to the board and a clamp member which is securable to the housing using the same components and operation of openings, resiliently-biased fingers and hooks as the vertical standoff previously described. In the assembled condition, the lower surface of the clamp and the top surface of the housing are spaced from each other by a distance sufficient to accommodate one or more layers of ribbon. The thickness of the clamp member is varied to provide sufficient space for the ribbons.

In accordance with another aspect of the present invention, there is herein illustrated and described a method of providing a bussing system for printed circuit boards, backplanes or the like employed on electronic equipment, wherein the system brings in power from an electrical supply source and distributes the power to one or more adjacent printed circuit boards. The method of the present invention includes the steps of: (a) providing a board and mounting a first member of the input connection means on the board; (b) making an electrical connection from the first member of the input connection means to the electrical supply source; (c) providing a plurality of taps and securing the taps on the board at respective selected locations, each of the taps having respective electrical contact means therein; (d) making respective plug-in electrical connections from the contact means in the respective taps to respective portions of the adjacent printed circuit boards; (e) providing a bussing means comprising a plurality of ribbons of flexible conductive material and connecting the ribbons to the input connection means and superimposing the ribbons upon one another at least at the first member of the input connection means on the board to thereby form a stack of ribbons; and (f) separating at least one of the ribbons from the stack of ribbons and bending the one ribbon as desired and receiving the ribbon within at least one of the respective taps so as to make electrical connection with the respective electrical contact means therein, thereby facilitating a substantially improved degree of flexibility for accommodating the distribution of the electrical power to the adjacent printed circuit boards.

The plurality of taps for the system may include all vertical taps wherein the bent ribbon is maintained in a vertical orientation, all horizontal taps wherein the bent ribbon is maintained in a horizontal position, or a combination of vertical and horizontal taps. The ribbon, being flexible, may be twisted substantially at right angles thereto for changing from one orientation to the other.

Preferably, at least one standoff is provided between the first member of the input connection means and the taps, and at least one of the ribbons is run through the standoff, the standoff being adapted to provide mechanical stability for the bussing system and to hold the ribbon in either a vertical or horizontal orientation off the board.

In accordance with yet another aspect of the present invention, a kit is provided for producing a bussing bussing for printed circuit boards and the like. The kit includes: (a) a plurality of tap means; (b) means for securing the tap means at desired selected locations on the board means; (c) means for maintaining mechanical rigidity of the ribbon; and (d) means for connecting the ribbon to an external electrical power supply. In addition, the kit could also include a flexible ribbon of substantially flat, relatively thin, flexible conductive material adapted to be bent and twisted as desired to be received within the respective tap means as the board.

The tap means may include vertical taps, horizontal taps, or any desired combination thereof; and the means for maintaining mechanical rigidity of the ribbon comprises a vertical or horizontal standoff secured to the board and arranged to keep the ribbon in a vertical or horizontal orientation respectively and off of the board.

These and other objects of the present invention will become apparent from a reading of the following specification, taken in conjunction with the enclosed drawings.

BRIEF DESCRIPTION OF THE DRAWINGS

FIG. 3 is a perspective view corresponding substantially to FIG. 1, but showing portions of the input connection means, vertical taps, horizontal taps, and standoffs, respectively, in exploded relationship thereto.

FIG. 18 corresponds to a portion of FIG. 17, but illustrates a right-angle twisting of the ribbon into a horizontal tap on the board.

FIG. 19 corresponds to FIG. 17, but further illustrates how the ribbon may be bent on an acute (or oblique) angle, but still in its vertical orientation, thereby further illustrating the inherent flexibility and advantages of the system of the present invention.

GENERAL DESCRIPTION OF THE PREFERRED EMBODIMENTS

Figure 1:
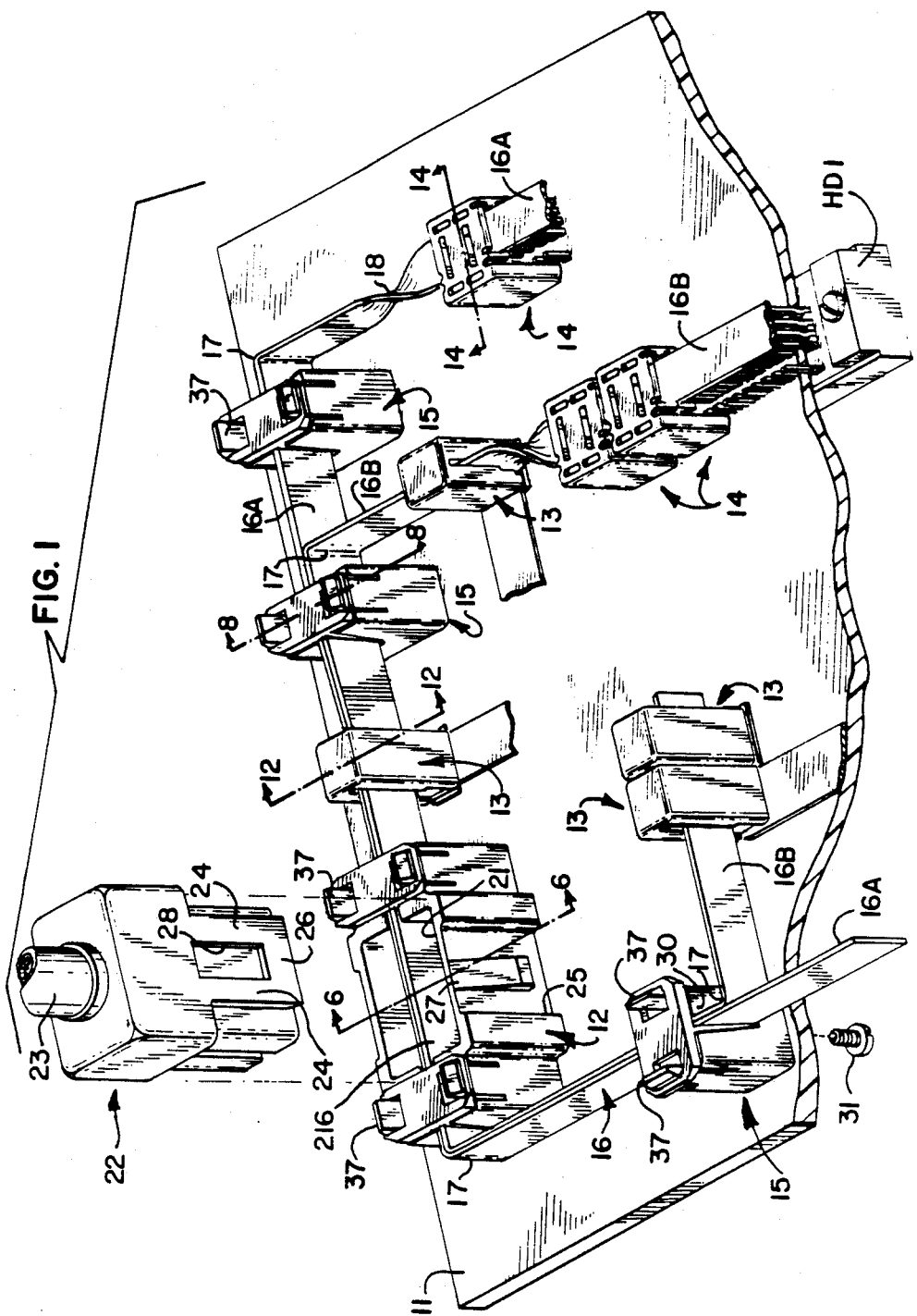
FIG. 1 is a perspective of a PC board incorporating the bussing of the present invention, the broken lines showing (in exploded relationship) a cable connection from the electrical power source to the input connection means on the PC board; and the view showing, first, a plurality of vertical taps, horizontal taps and standoffs, respectively, constituting the major modules of the system; and, second, further showing standard ribbons constituting relatively thin, substantially flat, flexible bus means running between the respective taps and standoffs on the top of the PC board.

With reference to FIGS. 1-4, there is illustrated the bussing system 10 of the present invention. The system 10 is embodied on circuit panel 11 having a selected major surface, panel 11 being adapted for distributing electrical power from a source to a plurality of adjacent circuit panels, such as PC boards, or the like which may be used, for example, in a computer. These adjacent panels form no part of the present invention, hence have been omitted for ease of illustration.

Accordingly, the bussing system 10 generally comprises an input connection means having a first member 12 mounted on the selected panel surface and a second member 22 secured to electrical cable 23, one or more vertical taps 13, and/or one or more horizontal taps 14, one or more standoffs 15, and a bus means comprising a flexible ribbon (or ribbons) 16. Taps 13 and 14 and standoffs 15 comprise the major modules of the system 10, and the modules are molded from a suitable dielectric material. Preferably, bus means or ribbons 16 are arranged in side-by-side relationship (at least at the first member 12 of the input connection means) to form a stack of ribbons. For illustration purposes, two of the ribbons 16A and 16B are shown; however, it will be appreciated that just one ribbon may be employed (or any number of ribbons may be employed in side-by-side relationship) consonant with the teachings of the present invention.

Figure 2:
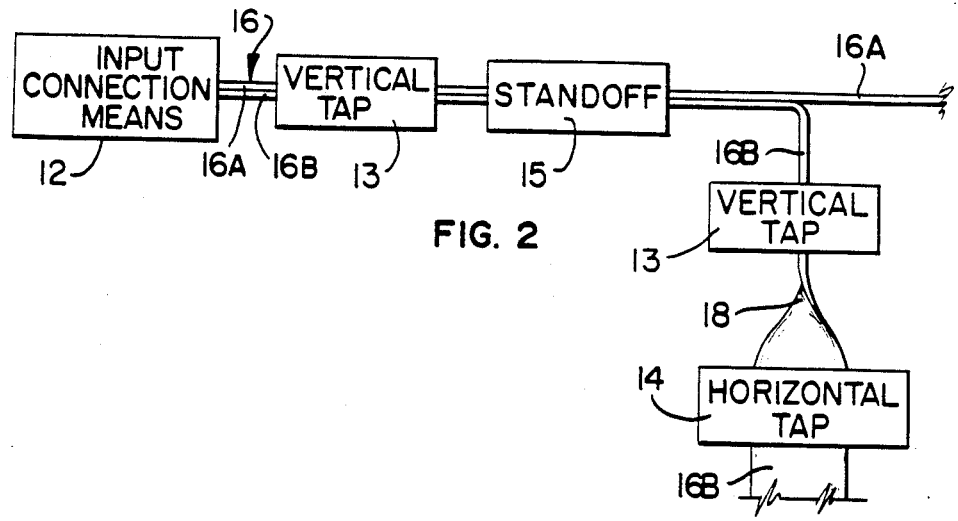
FIG. 2 is a schematic illustration of a top plan view of a portion of the board of FIG. 1, showing (in block diagram form) the input connection means, vertical tap, standoff, bend to a second vertical tap, and a twist at right angles to a horizontal tap.
Figure 4:
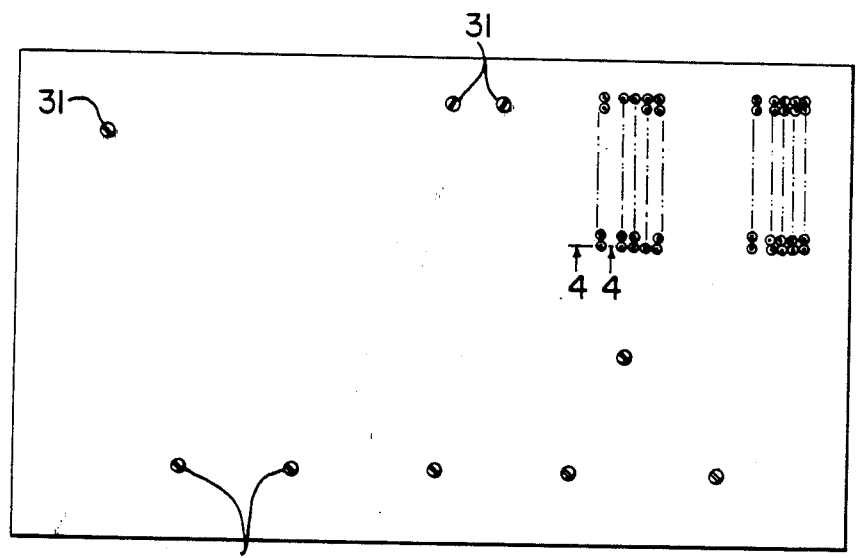
FIG. 4 is a bottom plan view of the PC board of FIGS. 1 and 3, the electronic components and soldered interconnections being omitted for ease of illustration.

With this in mind, FIGS. 1 and 2 illustrate, first, how ribbons 16 may be "routed" between the modules on the board 11. For example, a ribbon 16B may be bent away from the stack (or "peeled off") to form a right-angle bend, as at 17, for directing ribbon 16B to a vertical tap 13. Second, FIGS. 1 and 2 illustrate how a ribbon (either 16A or 16B) may be twisted, as at 18, substantially at right angles from its vertical orientation so that the ribbon is disposed in a horizontal plane (substantially parallel to the panel 11) and received in a respective horizontal tap 14.

The ribbons 16, which comprise the flexible bus means of the present invention, are relatively thin and relatively flat and are made of copper or copper alloy which may be used unplated or plated with tin or silver, as desired. In a practical embodiment, the ribbons 16 are 0.020 inches thick and 0.600 inches wide.

Figure 5:
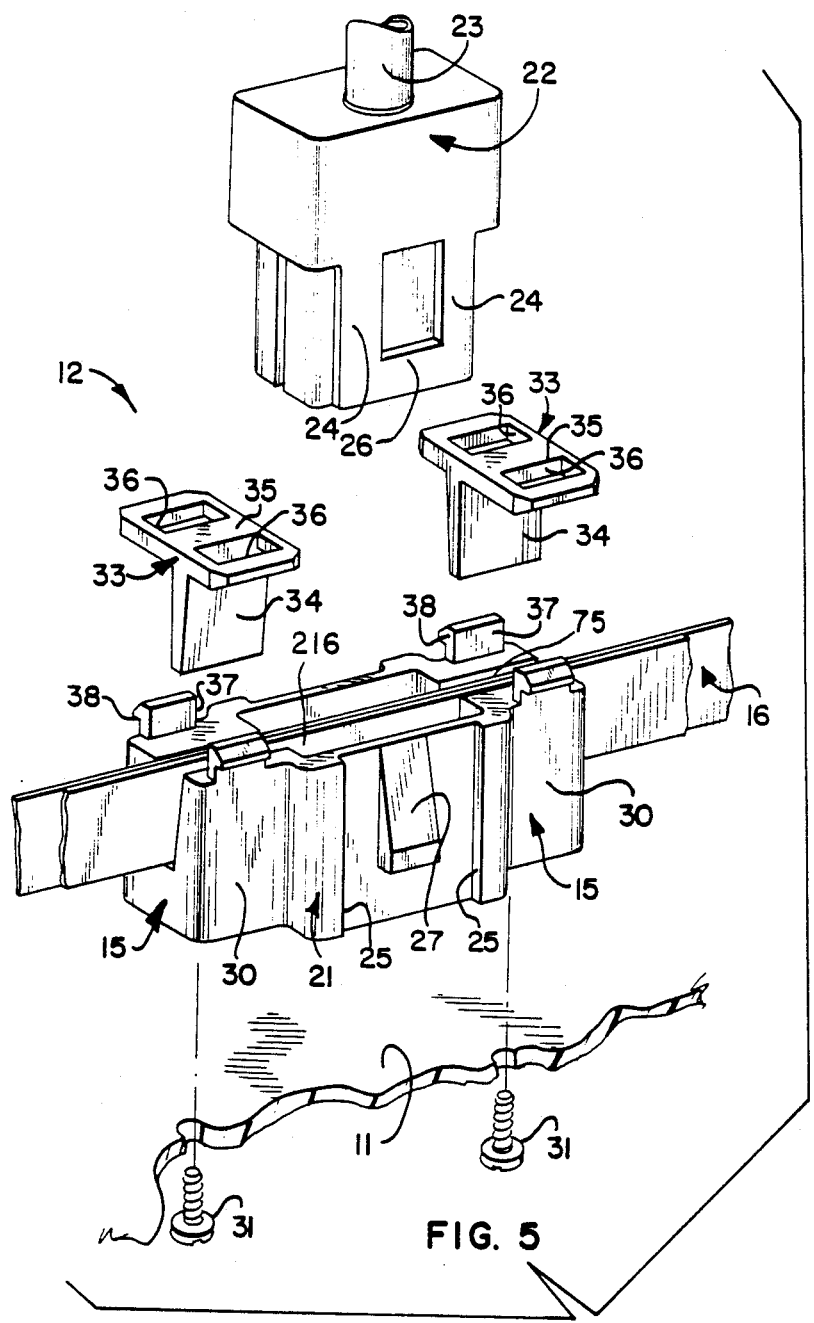
FIG. 5 is an exploded perspective of the input connection means, the cable connector leading to the power source (not shown), and the ribbons of flexible bus means of FIGS. 1 and 3, but drawn to an enlarged scale.
Figure 6:
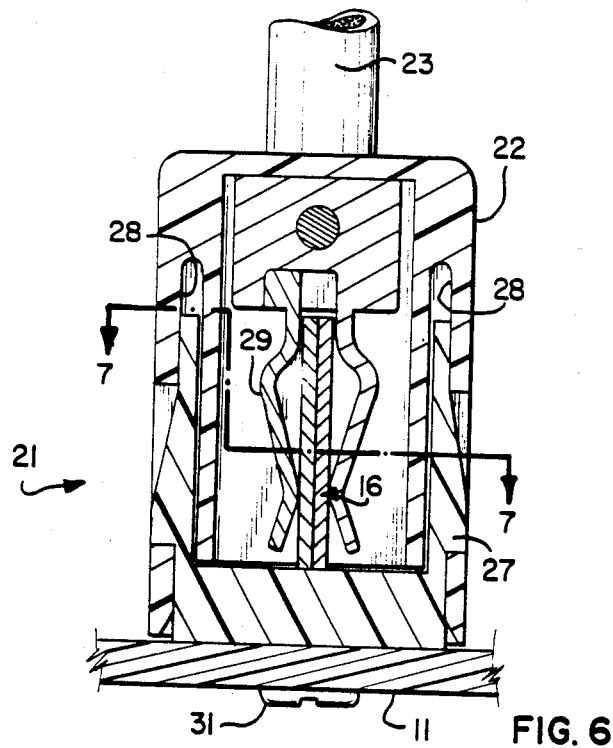
FIG. 6 is a section view, taken along the lines 6—6 of FIG. 1 and drawn to an enlarged scale, and showing a cable connector within the receptacle of the input connection means on the PC board.
Figure 7:
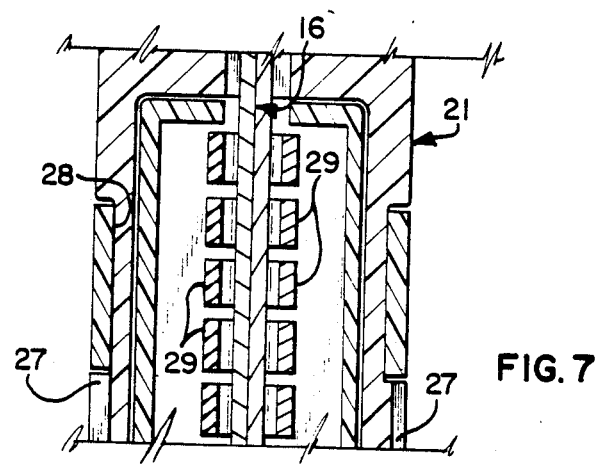
FIG. 7 is a stepped section view, taken along the lines 7—7 of FIG. 6.
Figure 8:
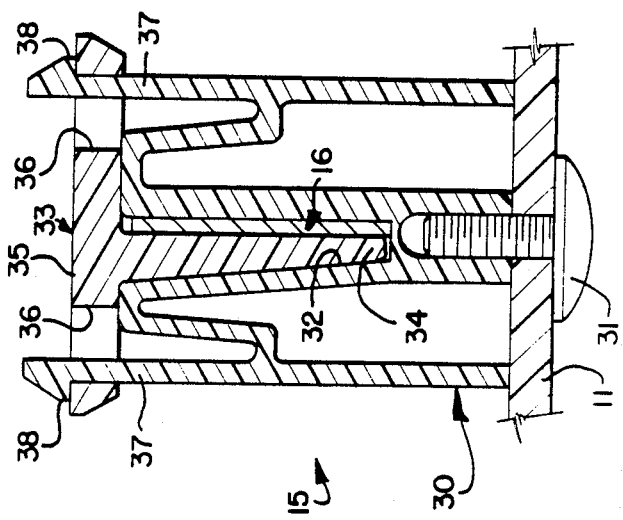
FIG. 8 is a section view, taken along the lines 8—8 of FIG. 1 and drawn to an enlarged scale, and showing one of the vertical standoffs with its clamp secured thereto, the clamp having a wedge received in a complementary tapered seat in the standoff and lodged against the ribbon therein, thereby maintaining the ribbon a given distance above the top surface of the PC board, and thereby maintaining the rigidity and structural integrity of the flexible bussing of the present invention.

With reference to FIGS. 5-7, first member 12 of the input connection means generally comprises two standoff portions spaced apart from one another and connected by a housing constituting a receptacle 21 therebetween. Receptacle 21 is secured to panel 11 by, for example, one or more screws 31, as shown in FIG. 6. Other hardware means as known in the art may also be used to mount the standoff modules to the panel. Each of the standoff portions is substantially identical to a standoff 15 (hereinafter to be described in detail) and the two standoff portions and receptacle 21 therebetween are preferably integrally molded together as a unitary assembly. A selected portion 216 of ribbon stack 16 is received in bus receiving aperture means 75, which extends continuously through first input connection member 12. Bus means or ribbon stack 16 is gripped between the two standoff portions of the unitary assembly and is disposed within receptacle 21 therein. In the embodiment shown herein, receptacle 21 is adapted to receive a complementary second input connection member 22, which carries an electrical cable 23 leading to the power source (not shown herein). It is to be understood that power may be supplied to the input connection means by "blind mating" it directly to a power supply through a drawer connector or the like. Conventionally, power is brought to a mother board in a vertical orientation.

Respective bifurcated side portions 24 of second input connections member 22 are adapted to be received in respective slots 25 in receptacle 21 as second input connection member 22 is received therein, and these respective bifurcated side portions 24 are sufficiently flexible to be cammed outwardly as latching portion 26 of side portions 24 rides up over an outwardly inclined ledge 27 formed integrally with receptacle 21. Thereafter, respective ledges 27 are received in respective slotted openings 28 in the bifurcated side portions 24 and are "snapped" therein with a detent-type of action, thereby removably retaining second input connection member 22 in receptacle 21 of first input connection member 12. The second input connection member carries resiliently biased respective contacts 29 which grip ribbons 16 therebetween, as shown more clearly in FIG. 6, and effect electrical connection from cable 23 to ribbons 16.

With respect to FIGS. 8-11, vertical standoff 15 comprises housing 30 secured to panel 11 by means of screw 31 or other mechanical means known in the art. The housing has bus recieving aperture means comprising a tapered slot 32 formed therein. Standoff 15 further comprises clamp 33 having depending tapered wedge 34 adapted to be received in the tapered slot 32. The wedge 34 is lodged against the side of selected portion 516 the ribbon (or ribbons) 16 within slot 32 so as to securely retain ribbons 16 therein. Clamp 33 has a top portion 35 provided with a pair of spaced-apart openings 36 formed therein. Housing 30 has a pair of complementary spaced-apart resiliently-biased fingers 37 integrally molded therewith. Fingers 37 are adapted to be received in respective pairs of openings 36 in top portion 35 of clamp 33. Each of the fingers 37 has an outwardly-extending hook portion 38 adapted to be lodged over top portion 35 of clamp 33, thereby retaining clamp 33 on housing 30. The resiliently-biased fingers 37 may be squeezed together by a pliers 39 or suitable tool (as shown more clearly in FIG. 10) so as to clear hooks 38 through respective openings 36 in top portion 35 of clamp 33, thereby allowing clamp 33 to be removed from housing 30. Thereafter, ribbon 16 may be lifted out of slot 32 in housing 30 of vertical standoff 15.

Figure 9:
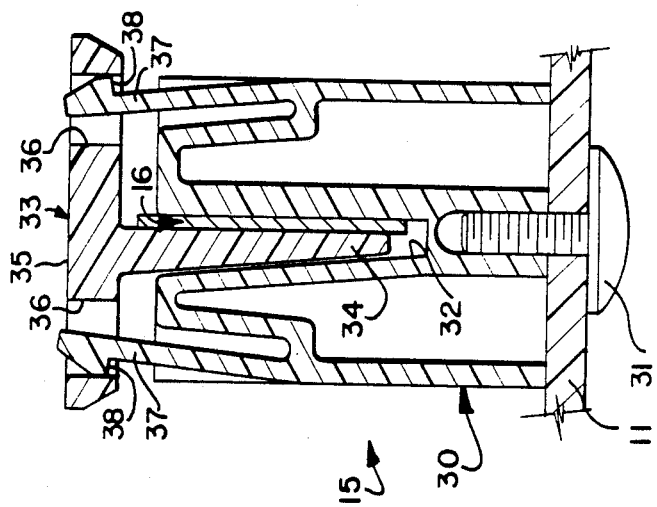
FIG. 9 is a further section view, corresponding substantially to that of FIG. 8, but showing the resilient fingers on the standoff being squeezed together so that the respective hook portions on the resilient fingers clear the respective openings in the top portion of the clamp such that, thereafter, the clamp may be lifted off of the standoff to release the wedge from its bearing engagement against the side of the ribbon.
Figure 9A:
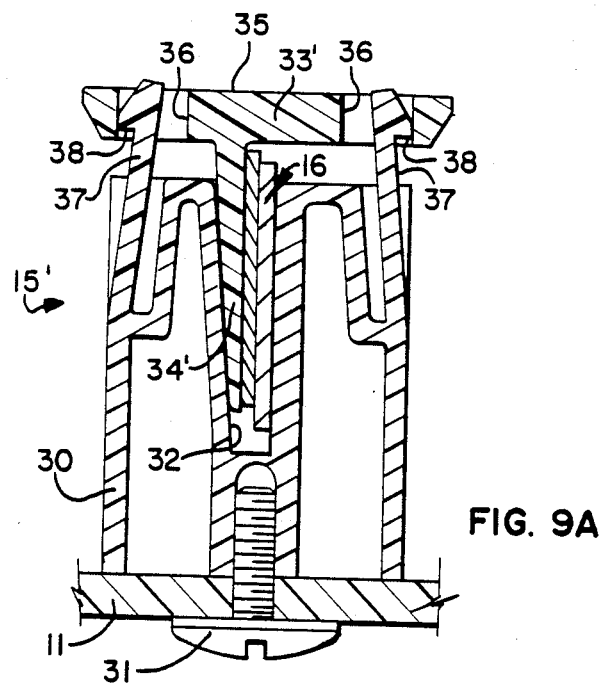
FIG. 9A is a further section view, corresponding substantially to a portion of FIG. 9, but showing an alternate embodiment of the standoff, wherein a plurality of ribbons is clamped therein (rather than a single ribbon as in FIG. 9).
Figure 10:
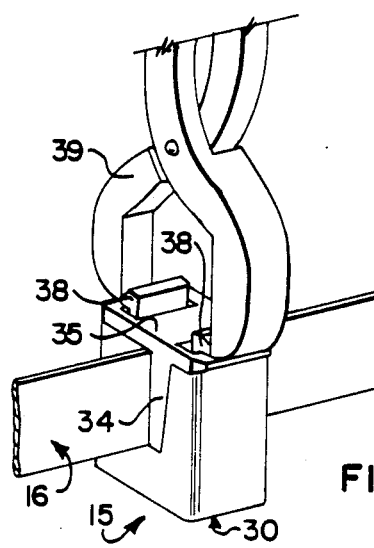
FIG. 10 is a perspective view of a standoff, showing the use of a tool to squeeze the resilient fingers together.
Figure 11:
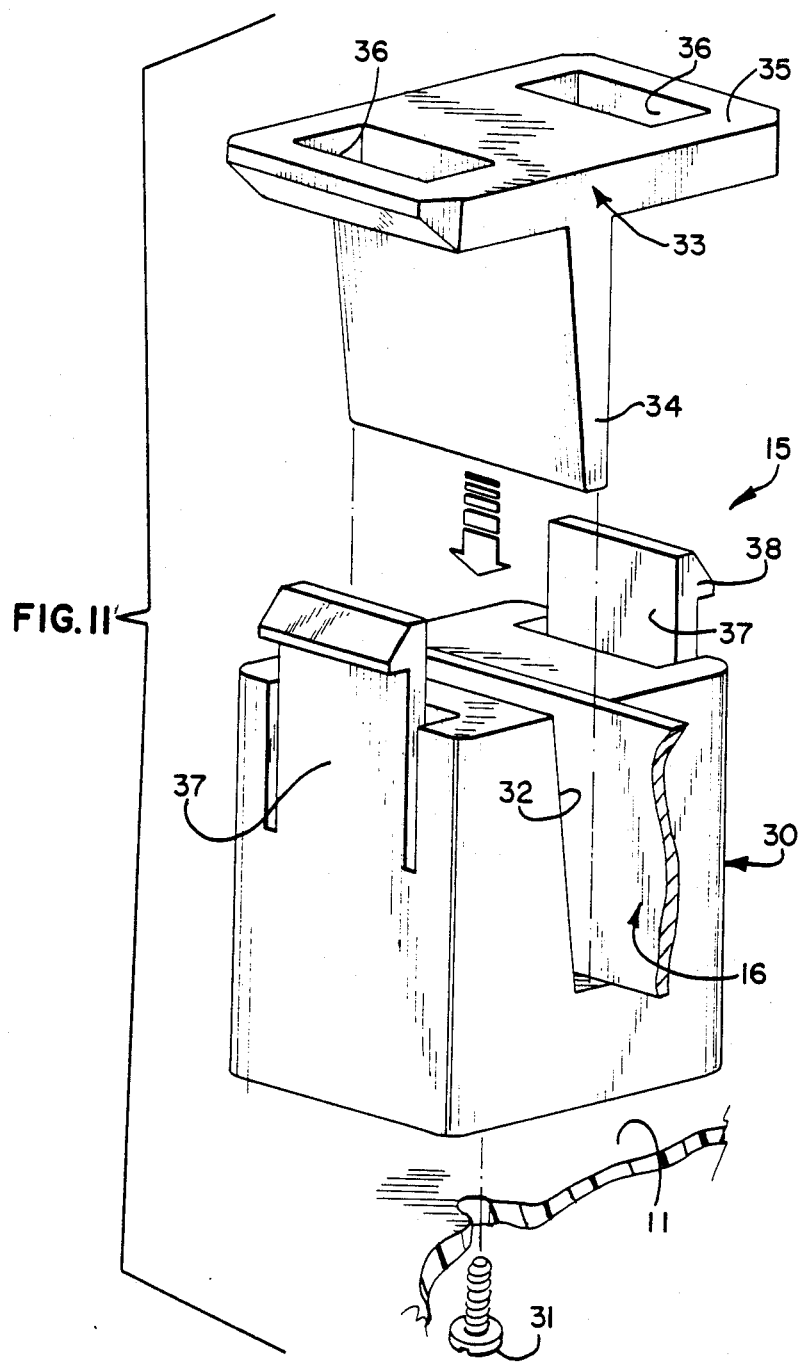
FIG. 11 is an section perspective view (drawn to an enlarged scale) of the vertical standoff, ribbon and clamp.

With reference to FIG. 9A, an alternate embodiment of vertical standoff, denoted by 15,, is illustrated. Standoff 15', has an identical housing 30 (as standoff 15 of FIGS. 8-11) but is provided with an alternate clamp 33', having a thinner tapered wedge 34', This alternate standoff 15', is adapted for retaining a plurality of ribbons 16. However, the components and operation of the standoff 15', of FIG. 9A (including its openings 36, resilient fingers 37, and hooks 38) are identical to that of standoff 15 of FIG. 9, thereby resulting in a standardization of molded parts for manufacturing economy. In a practical commercial embodiment of the standoffs, one, two, or three ribbons 16 (stacked side-by-side) may be employed, in which case only the wedge portion 34 of the clamp 33 is different. However, it may be appreciated that the standoffs could be made to accommodate more than three ribbons 16, if desired, consonant with the teachings of the present invention.

Figure 11A:
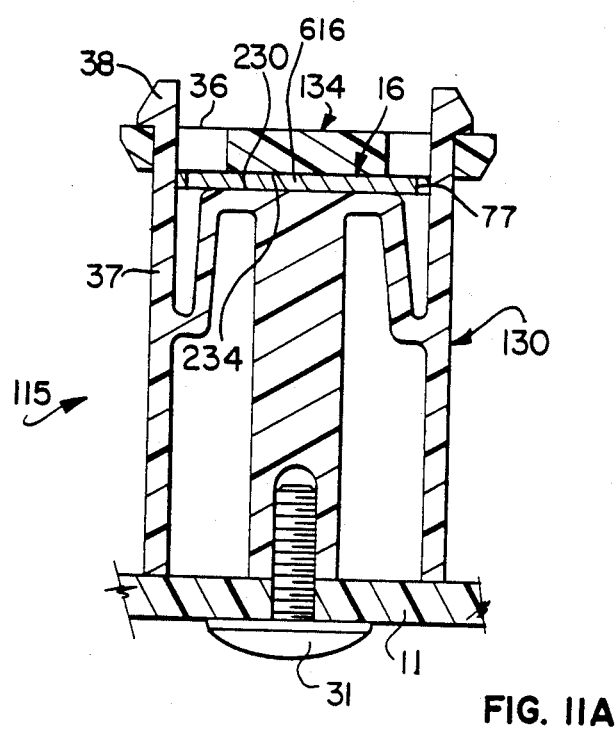
FIGURE 11A is an exploded perspective view (drawn to an enlarged scale) of a horizontal standoff, ribbon and clamp.

FIG. 11A is a section view of a horizontal standoff 115. Standoff 115 is comprised of housing 130 and clamp 134. In the assembled standoff, selected portion 616 of ribbon 16 is received in and passes through bus receiving aperture means 77, which comprises a space between the top surface 230 of housing 130 and bottom surface 234 of clamp 134. Since ribbon 16 is inserted horizontally into standoff 115, housing 130 does not require a vertical slot as does vertical standoff 15. There is no corresponding wedge required on clamp 134. In other respects, however, housing 130 is essentially identical to vertical standoff housing 30. Clamp 134 attaches to housing 130 using the same components and operation of openings 36, resilient fingers 37 and hooks 38. The thickness of clamp 134 may be varied to provide sufficient space 77 between the lower surface of clamp 134 and upper surface of housing 130 to accommodate a plurality of ribbons 16, thereby resulting in a standardization of molded parts for manufacturing economy.

Figure 12:
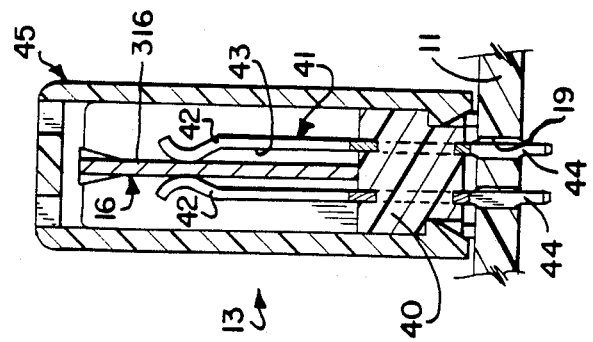
FIG. 12 is a section view of one of the vertical taps, taken across the lines 12—12 of FIG. 1 and drawn to an enlarged scale.
Figures 13, 13A:
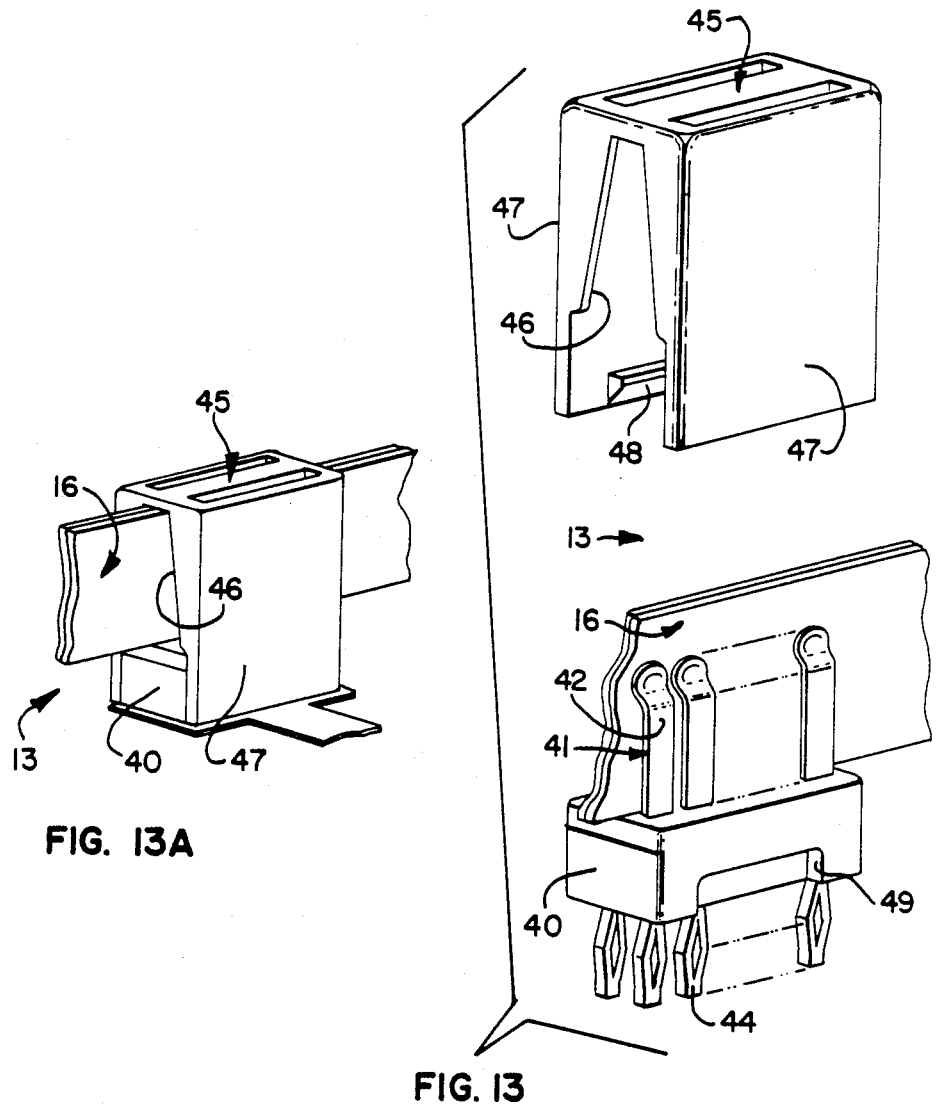
FIG. 13 is a perspective view of the vertical tap, showing a pair of ribbons therein, and further showing the cover for the vertical tap in exploded relationship thereto.
FIG. 13A is a perspective view of the pair of ribbons within the vertical tap, the cover being secured thereto.

With reference to FIGS. 12, 13 and 13A, vertical tap 13 includes an insulated or dielectric base 40. A contact 41 is carried by the base 40, and contact 41 has respective portions extending above and below the base. The portion of the contact 41 extending above the base 40 is slotted to form respective pairs of resiliently-biased contact members 42 disposed in a parallel stacked relationship with each other and defining therebetween a contact plane comprising a slot bus recieving aperture means or 43 for receiving at least one of the ribbons selected portion 316 of 16 such that ribbon 16 makes an electrical connection with the contact 41 in the vertical tap 13.

The respective portions 44 of contacts 41 extending below base 40 is preferably formed as a compliant pin, such as the one disclosed in U.S. Pat. No. 4,186,192 wherein a section of the pin is sheared or split to form a pair of offset legs which fit into and grip the walls of through holes 19 in the printed panel or circuit board without damaging the plated surface of the holes of the printed circuit board. The legs of the compliant pin described therein move inwardly as the pin is inserted, thereby producing an opposing force between the legs and the plated through hole, thus anchoring the component on the board and providing electrical connection to the undersurface of the board. It is to be understood that other means and other contacts, such as those having solder posts, may also be used to mechanically anchor and electrically connect components to the board.

Each of the vertical taps 13 includes a cover 45 adapted to be received on its base 40 to enclose the contact 41 and the ribbon 16 therein. The cover 45 is also integrally molded of a suitable dielectric material and, preferably, is substantially prismatic and is provided with aligned slots 46 to accommodate the passage of the ribbon 16 through the vertical tap 13. The cover 45 includes a pair of parallel side walls 47. The side walls 47 have respective inwardly-protruding longitudinal ribs 48 formed thereon, one of which is shown more clearly in FIG. 13; and the base 40 has a pair of complementary longitudinal relieved portions 49, one on each side thereof, such that the cover 45 may be received over the base 40 and snapped in place.

Figure 14:
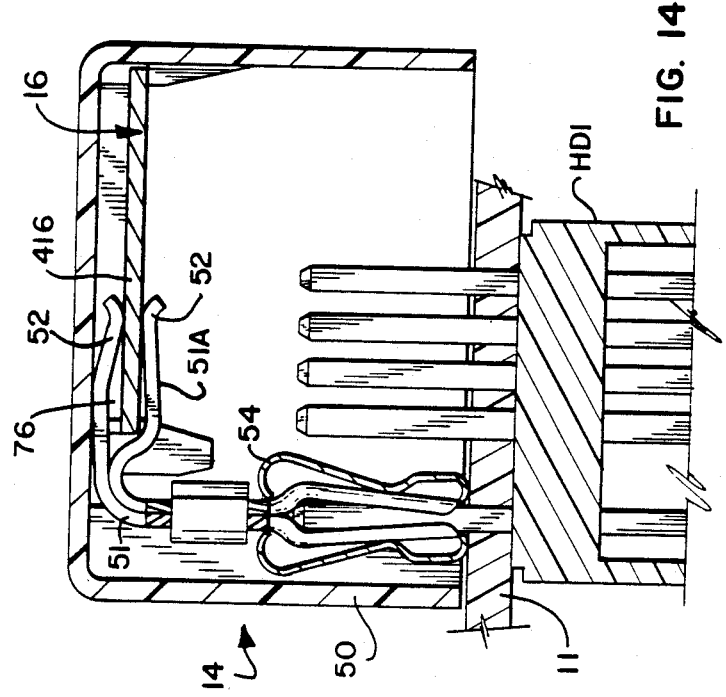
FIG. 14 is a section view of the horizontal tap, taken across the lines 14—14 of FIG. 1 and drawn to an enlarged scale.
Figure 15:
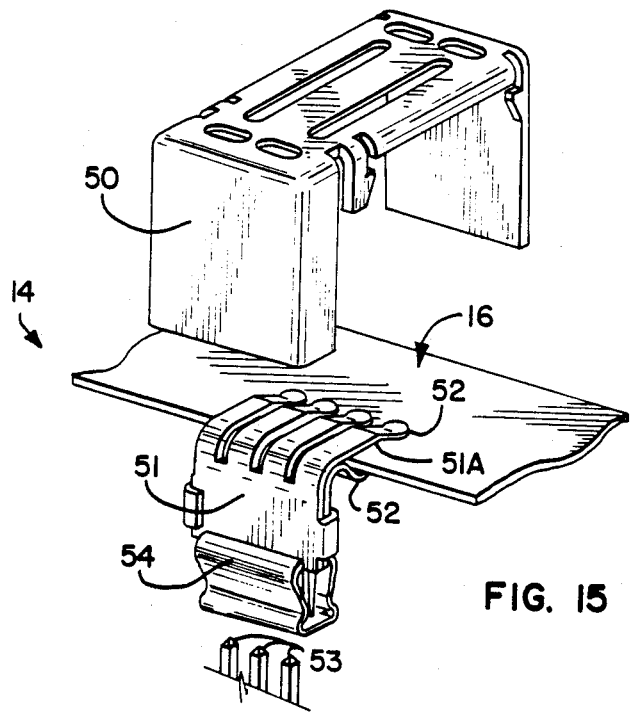
FIG. 15 is an exploded perspective view of the horizontal tap, showing the contact, ribbon and cover.

With reference to FIGS. 14 and 15, horizontal tap 14 includes a cover 50 and further includes at least one contact 51 having a portion 51a thereof bent substantially at right angles thereto so as to be substantially parallel to panel 11 when horizontal tap 14 is mounted on panel 11. The portion 51a of the contact 50 is formed with a plurality of resiliently-biased contact members 52 having bus receiving aperture means or slot 76 defined therebetween, which receives a selected portion 416 of ribbon 16 (similar to the contact members 42 of vertical tap 13, but arranged in a horizontal rather than a vertical plane). Horizontal tap 14 further includes a plurality of posts 53 which are anchored in respective through holes 19 in board 11. These posts 53 are suitably connected to a high-density ("HDI") connector 90 carried by an adjacent PC panel or board. The HDI connector, being conventional, has been illustrated only partially in FIGS. 1 and 14. A retention locking spring 54 locks the posts 53 to the contact 51.

The modules of the present invention are integrally molded from a suitable dielectric material, and the various contacts are stamped and formed from a suitable metal.

With reference to FIGS. 16-19, the inherent utility, features, and advantages of the bussing system of the present invention will become more readily apparent.

Figure 16:
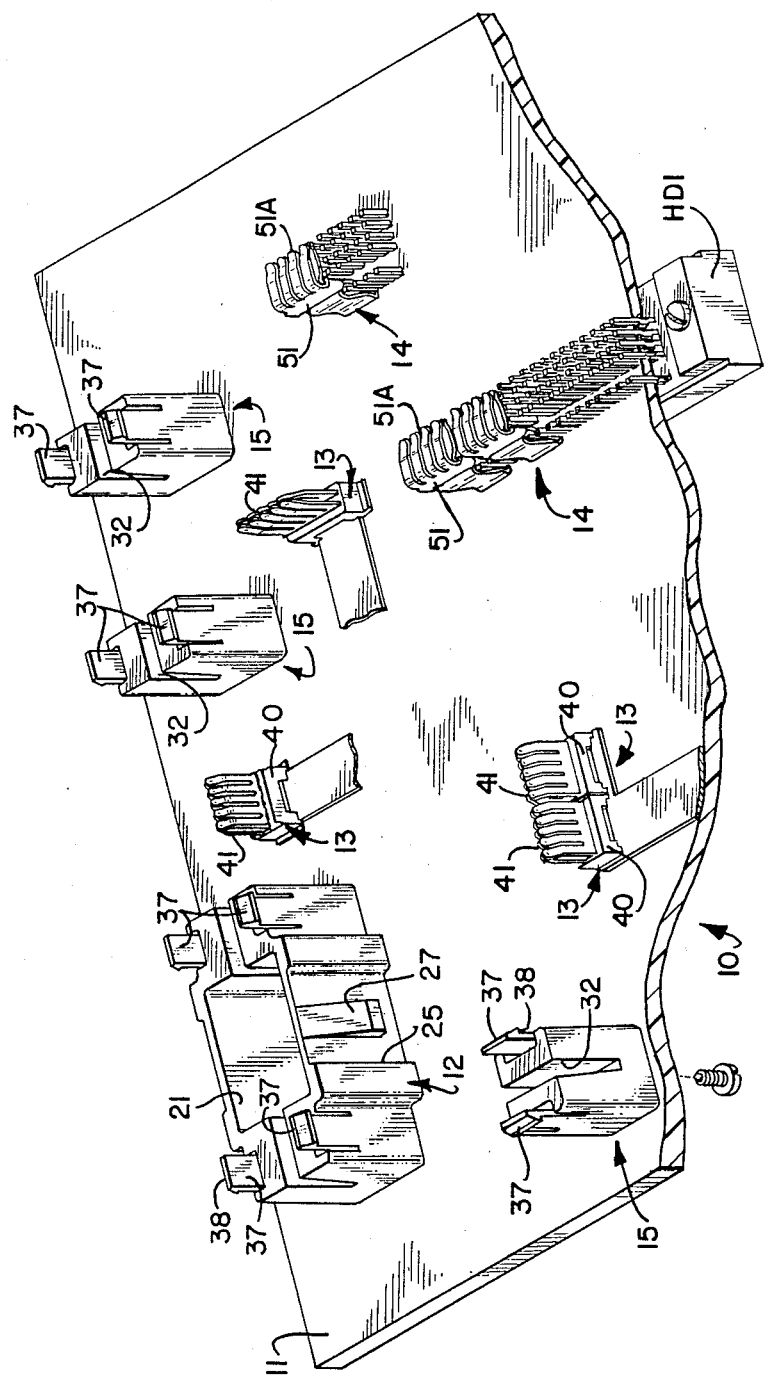
FIG. 16 is a perspective view of the PC board, corresponding substantially to FIG. 1, but showing the taps and standoffs constituting the modules mounted in the board but with the respective covers and clamps removed therefrom.

In FIG. 16, the major modules of the system—including the input connection means 12, vertical taps 13, horizontal taps 14, and standoffs 15—have been arranged on board 11 at locations convenient for interconnection to existing PC boards or the like. This arrangement provides the engineer or designer (or even the installer) a much desired flexibility in tailoring the panel 11 (or backplane) to a wide variety of configurations and existing installations, thereby substantially reducing the time factors involved, and thereby effecting a substantial reduction in development and tooling costs. In FIG. 16, the respective covers for the major modules on the board have been removed.

Figure 17:
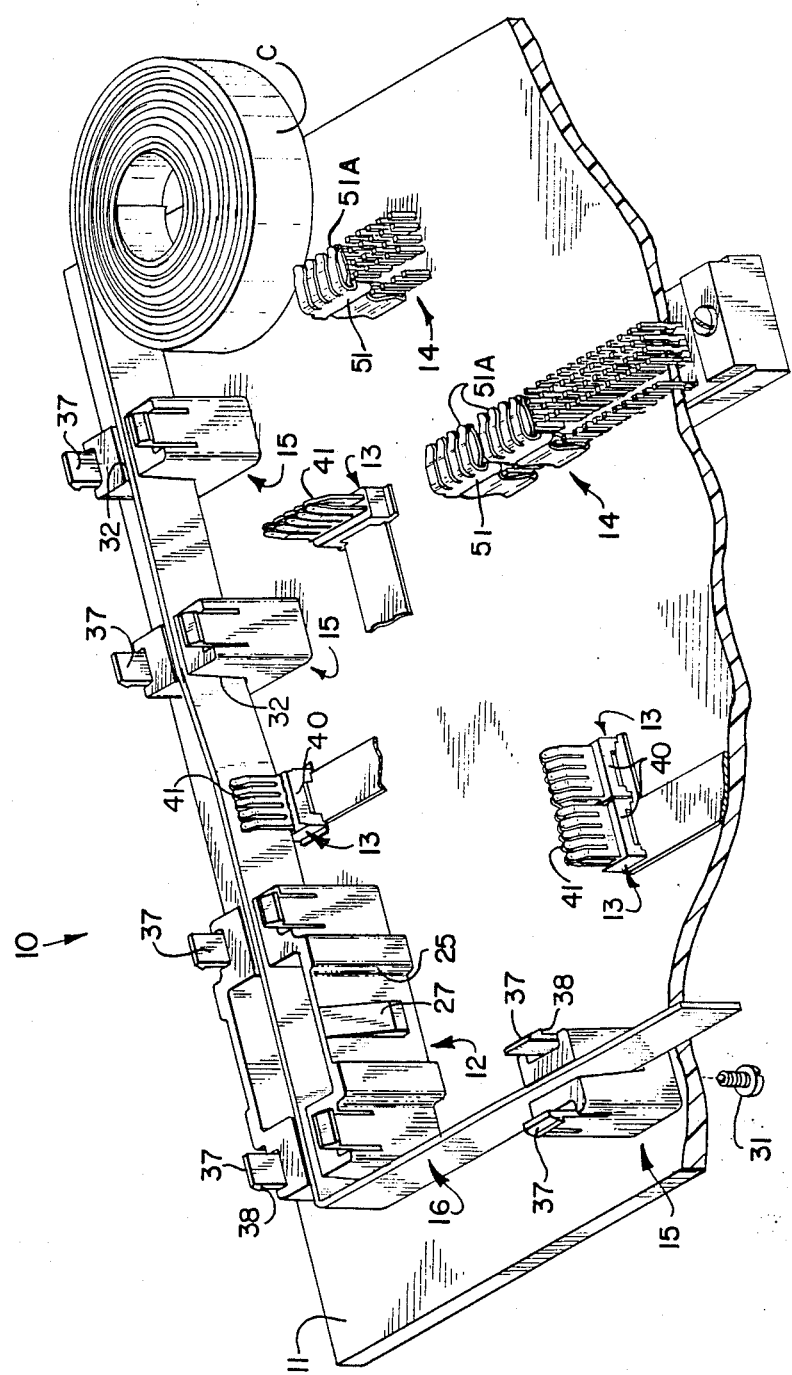
FIG. 17 corresponds to FIG. 16, but shows the flexible ribbons constituting the respective bus means being received within the modules on the board.

Thereafter, and as shown in FIG. 17, a single ribbon 16 (provided on coil C) is routed between the major modules of the system 10 on the board 11. The ribbons 16 which are made of relatively soft, plated or unplated, copper or copper alloy (and are relatively thin and substantially flat) are fed from one module to another—in this case, from input connection means 12 through a first vertical tap 13 and then through a standoff 15—thereby quickly and easily routing the ribbons 16 around the board 11.

As shown in FIG. 18, the ribbon 16 has been twisted at right angles thereto for passing the ribbon 16 through a first horizontal tap 14.

As the routing of the ribbon 16 has been effected (partially or completely), the covers may be installed on the modules, respectively.

With reference to FIG. 19, a pair of ribbons 16 is employed, being in side-by-side stacked relationship to one another, and constituting a first ribbon 16A and a second ribbon 16B. The ribbons 16A and 16B are clamped within the receptacle 21 of the first input connection member 12 (for electrical connection with the second input connection member 22) and the "first" part of the ribbons 16A and 16B extend from the receptacle 21 through a first vertical tap 13 and a first standoff 15. Ribbon 16A continues through a second standoff 15 and, thereafter, ribbon 16A is twisted at right angles thereto (as at 18) and is received within a first horizontal tap 14. Ribbon 16B is bent at right angles thereto (but still maintained in a vertical orientation) and is received within a second vertical tap 13 and into a second horizontal tap 14. The "rear" part of ribbons 16A and 16B pass out the opposite end of receptacle 21 and through a third standoff 15. Thereafter, ribbon 16B is bent away from ribbon 16A and passes into a pair of vertical taps 13a and 13b arranged in a stacked formation and comprising a third vertical tap and a fourth vertical tap. The ribbon 16B is bent at an acute (or oblique) angle, which further illustrates the total flexibility of the system of the present invention; that is, the flexible ribbons 16 of the bussing system of the present invention may be bent and/or twisted as desired for a particular set of conditions so that the designer is not constrained but, rather, has almost complete freedom to readily produce a board (or backplane) as may be needed. This is a substantial improvement heretofore not available in the prior art.

Figure 20:
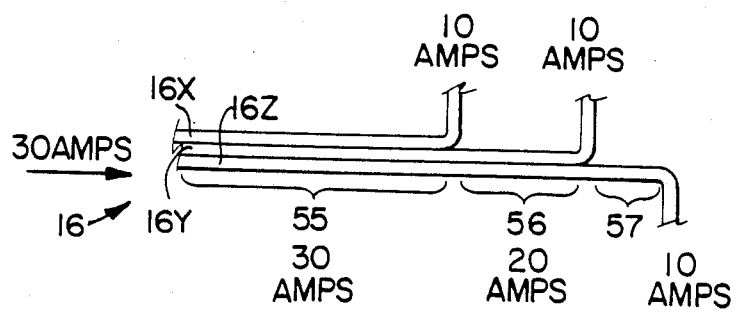
FIG. 20 is a schematic view of three flexible ribbons in side-by-side stacked relationship, illustrating the variable circular mil area ("CMA") feature of the present invention.

Of still further significance, the flexible bussing system of the present invention provides a variable "CMA" (circular mil area) feature, so that sufficient current-carrying capacity is available at any place on the board without requiring extra (or "massive") material beyond that which is necessary to carry the desired current, thereby resulting in a considerable savings in material costs. For example, and as illustrated schematically in FIG. 20, a stack of three ribbons (16X, 16Y, and 16Z), each carrying ten (10) amps is employed. The input consisting of thirty (30) amps (in this example) is accommodated by all three ribbons (16X, 16Y, and 16Z) in region 55; twenty (20) amps is accommodated in region 56 (ribbons 16Y and 16Z); and ten (10) amps is accommodated in region 57 (ribbon 16Z) which has a still smaller CMA.

Figure 22:
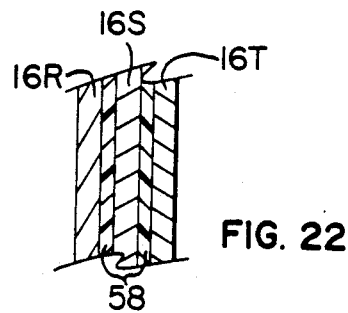
FIG. 22 is a section view, taken across the lines 22—22 of FIG. 21 and drawn to an enlarged scale, and showing the insulation between respective ribbons.
Figure 21:
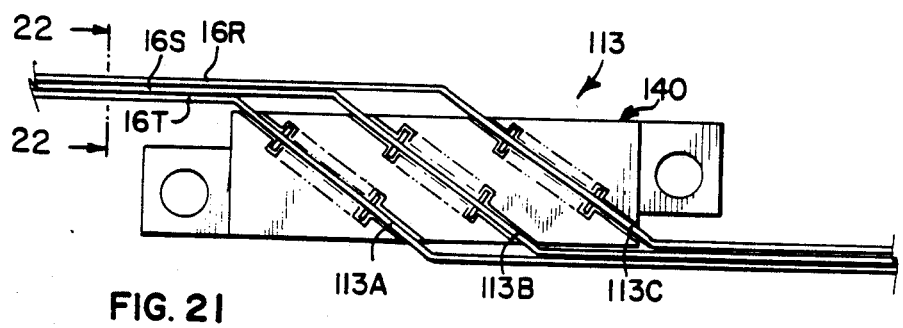
FIG. 21 corresponds to a top plan view of the stacked ribbon of FIGS. 1-19, but further illustrates a modification thereto, wherein insulation is disposed between the respective ribbons, such that different input voltages and currents may be brought into the PC board through a single bussing system and distributed throughout the board.

With reference to FIGS. 21 and 22, an alternate embodiment is illustrated, wherein the flexible ribbons 16R, 16S and 16T have insulation 58 disposed therebetween. With this arrangement, the flexible bussing of the present invention is adapted to distribute electric current around a printed circuit board, and the insulation on the bussing allows multiple bussing ribbons to be routed in close physical proximity while remaining electrically isolated. Adjacent insulated bussing ribbons may carry identical voltages or different voltages, depending upon the design of the board. The insulation 58 may be of any suitable type, preferably a strippable type so that connection can be made to the bus bar at numerous places along its length as the means is routed around the printed circuit board.

FIG. 21 also illustrates vertical tap module 113 having housing 140 which includes a plurality of vertical taps 113A, 113B and 113C, one for each of bussing ribbons 16R, 16S and 16T such that a plurality of bussing ribbons can be terminated in a single housing member. The flexibility of ribbons 16R, 16S and 16T permit them to enter housing 140, be bent to enter respective taps 113A, 113B or 113C, and bent again to exit housing 140.

Figure 23:
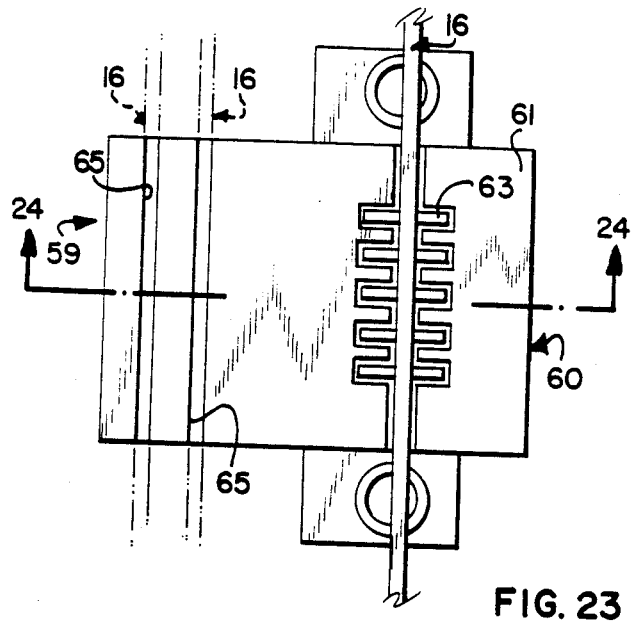
FIG. 23 is a top plan view of a first alternative embodiment of a vertical tap having a first alternative embodiment of the electrical contact means engaging one ribbon and pass through slots for other ribbons, the view being taken looking down on FIG. 24.
Figure 24:
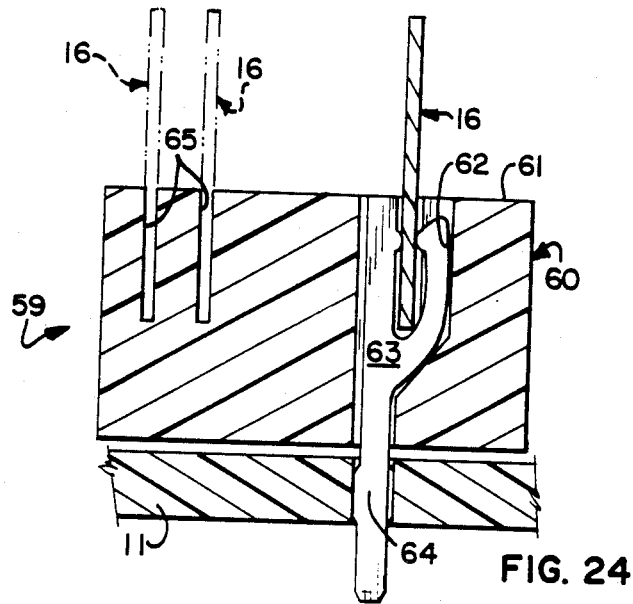
FIG. 24 is a perspective section view of the vertical tap of FIG. 23, taken along the lines 24—24 of FIG. 23.

With reference to FIGS. 23 and 24, an alternate vertical tap 59 is illustrated which is capable of terminating to a printed circuit board, preferably by means of compliant pins or solder tabs as previously described. Tap 59 has a molded dielectric housing 60 preferably having a flat top 61 for ease of inserting the tap into the board with conventional tooling. Housing 60 is slotted, as at 62, to receive one or more contacts 63. Contact 63—referred to in the art as a "tuning fork" contact—is bifurcated to receive flexible bussing bar ribbon 16 and has compliant pin portion 64 which extends through panel 11 and is securely gripped therein. The amperage rating for the module can be varied by providing a plurality of contacts. Additional (parallel) slots 65, not having electrical contacts therein, may be formed in the plastic housing 60 to mechanically support additional bussing ribbons 16 if desired. It is to be understood that tap 59 may be used with bare or insulated bus means, and with bussing ribbons having identical or multiple voltages.

Figure 25:
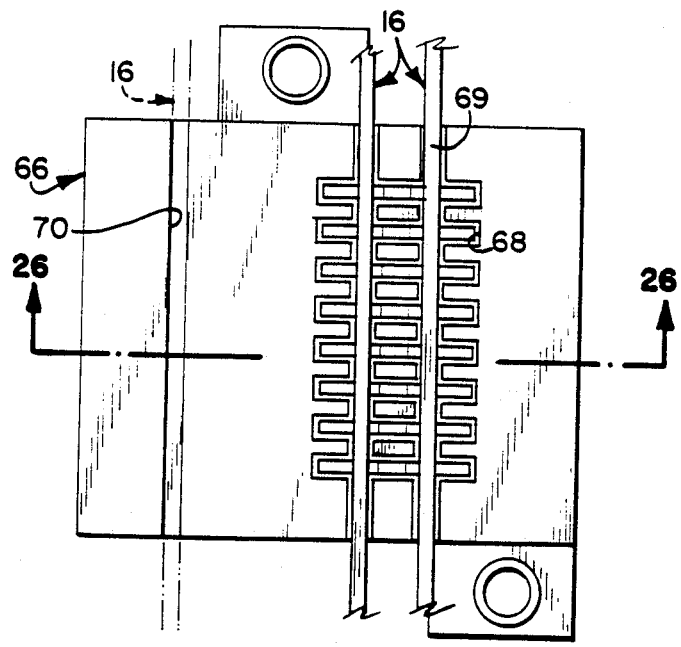
FIG. 25 is a top plan view of a second alternative embodiment of a vertical tap having a second alternative embodiment of the electrical contact means engaging two ribbons and a pass-through slot for another ribbon, the view being taken looking down on FIG. 26.
Figure 26:
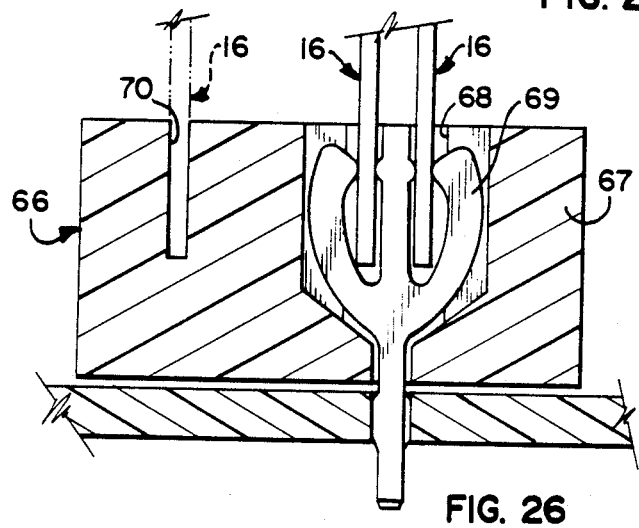
FIG. 26 is a perspective section view of the vertical tap of FIG. 25, taken along the lines 26—26 of FIG. 25.

With reference to FIGS. 25 and 26, a further vertical tap module 66 is illustrated, wherein plastic housing 67 is slotted as at 68 to receive one or more dual contacts 69. These dual contacts 69 will allow current to be taken off of two bussing ribbons 16. In this embodiment, both bussing ribbons passing through contact 69 would carry the same voltage. Thus, if each bussing ribbon 16 is rated (for example) at twenty (20) amps, then the module 66 could tap off up to forty (40) amps from the two bussing ribbons 16. The number of contacts 69 on the module 66 may be increased, if required, to handle the current. An additional section can be added to the plastic housing 67 to provide a slot 70 to mechanically support a third bussing ribbon. This third bus bar is not terminated in this housing 67, and thus no contacts are disposed in the slot 70.

The flexibility of the bussing system 10, vertical and horizontal taps 13,14, and vertical and horizontal standoffs 15,115, permits the modules for the system to be packed in a kit for assembly by a customer. The number and type of modules provided in the kit would depend upon the configuration of the board. To allow greater flexibility in using the standoff modules, each vertical housing 30 could be supplied, for instance, with a plurality of wedged clamps 34, each having wedges dimensioned to secure one, two or three vertical ribbons. Horizontal standoff housings 130 could also be supplied with clamps 134 dimensioned to secure one, two or three horizontal ribbons. If desired, the bus bar ribbons 16 may also be provided with the modules.

Obviously, many modifications may be made without departing from the basic spirit of the present invention. Accordingly, it will be appreciated by those skilled in the art that, within the scope of the appended claims, the invention may be practiced other than has been specifically described herein.

What is claimed is:

1. A vertical tap for use in a system for distributing power from a power supply to at least one circuit board, where bus means comprises relatively thin, substantially flat ribbons arranged in a stacked relationship, each ribbon being adapted to be bent away from the stack to a desired location on the board, the vertical tap being adapted to receive at least one ribbon, the vertical tap comprising:
   an insulated base;
   at least one electrical contact means carried by the base, the at least one contact means having respective portions extending above the base and further including an array of contact sections extending below the base for electrical connection to the circuit board;
   the portions extending above the base including respective pairs of resiliently-biased electrical contact members, the members of each pair defining a slot therebetween, said pairs of said members being disposed in a parallel spaced relationship with each other and said slots being aligned and defining a bus receiving aperture means for receiving said at least one ribbon, continuously therethrough whereby the at least one ribbon makes an electrical connection with the at least one contact means in the vertical tap; and
   a cover for being fitted over the contact members and including latch means for latching to cooperating latch means of said base after placement of the bus means through said bus receiving aperture means, said cover including apertures at opposed ends defining exits for said bus means.

2. A horizontal tap for use in a system for distributing power from a power supply to at least one circuit board, wherein bus means comprises a stack of relatively thin, substantially flat, flexible ribbons, each ribbon being adapted to be bent away from the stack to a desired location on the board, the horizontal tap adapted to receive at least one ribbon, the horizontal tap comprising:
   at least one contact means having a portion thereof bent substantially at right angles thereto so as to be substantially parallel to the board when the horizontal tap is mounted on the board; said contact means including at least
   one pair of resiliently-biased contact member defining a bus receiving aperture means therebetween for receiving said at least one ribbon continuously therethrough;
   a plurality of posts anchored on the board;
   a retention spring locking the posts to the contact means; and
   a cover fitted over the contact means the covering including latch means for locking one of the bus bar ribbons and the contact together.

3. A kit for producing a system for distributing power from a power supply to at least one circuit board, comprising;
   a plurality of tap means, said tap means including an insulated base having at least one electrical contact means carried by the base, the at least one contact means having respective portions extending above the base and further including an array of contact sections extending below the base for electrical connection to the circuit board, the portions extending above the base including respective pairs of resiliently-biased electrical contact members, the members of each pair defining a slot therebetween, said pairs of said members being disposed in a parallel spaced relationship with each other and said slots being aligned and defining a bus receiving aperture means for receiving bus means continuously therethrough whereby the bus means makes an electrical connection with the at least one contact means in the tap,
   the tap means being securable at desired selected locations on board means;
   separate means for maintaining mechanical rigidity of the; and
   separate means for connecting the bus means to an external electric power supply.

4. The kit as described in claim 3, further including a flexible ribbon of substantially flat, relatively thin, flexible conductive material adapted to be bent and twisted as desired to be received within the respective tap means of the board.

5. The kit of claim 3 further including:
   a cover for being fitted over the contact members and including latch means for latching to cooperating latch means of said base after placement of the bus means through said bus receiving aperture means, said cover including apertures at opposed ends defining exits for said bus means.

6. An electrical tap member for use in a flexible bussing system, said system including bus means comprising at least one relatively thin, substantially flat ribbon member, said tap comprising
   an insulated base;
   at least one electrical contact means carried by said base, said at least one electrical contact means having respective portions extending above said base, and further including an array of contact sections extending below the base for electrical connection to a circuit board, said respective portions extending above said base including respective pairs of resiliently biased contact members, the members of each pair defining a slot therebetween, said pairs of said members being disposed in a parallel spaced relationship with each other, said slots being aligned and defining a bus receiving aperture means extending from one side to another thereof, said aperture means receiving said bus means therethrough defining a bus portion constrained therewithin to which said electrical contact means of said tap member is electrically connected; and wherein said respective contact sections extending below the base are adapted to be secured in respective holes in a circuit panel whereby said tap member is mounted to a selected horizontal major surface of said panel; and a cover for being fitted over the contact members and including latch means for latching to cooperating latch means of said base after placement of the bus means through said bus receiving aperture means, said cover including apertures at opposed ends defining exits for said bus means, whereby said bussing system distributes power from a power supply to at least one circuit board.

7. The electrical tap member of claim 6 wherein said bus receiving aperture means extends in a direction substantially parallel to said selected panel surface and defines a vertical slot between said pairs of contact members.

8. The electrical tap member of claim 6 wherein said bus receiving aperture means extends in a direction substantially parallel to said selected panel surface and defines a horizontal slot between said pairs of contact members.

9. The electrical tap member of claim 6 wherein said bus means includes a plurality of ribbon members and said cover means includes at least one bus receiving slot extending from one side to the other, essentially parallel to and proximate said bus receiving aperture means whereby said bus means enters said tap, engages said contact members and exits said tap.

10. The electrical tap member of claim 9 wherein said cover member further includes at least one additional slot remote from each said at least one bus receiving aperture means, each said at least one additional slot defining a bus bypass slot, said at least one bypass slot being remote from said contact means whereby at least one of said plurality of ribbons may extend through said tap member without engaging said contact means.

11. The electrical tap member of claim 6 wherein said bus means includes a plurality of ribbons and said tap member includes a plurality of electrical contact means carried by said base, each of said plurality of electrical contact means having respective portions extending above and below said base, each said respective portion extending above said base including a plurality of pairs of resiliently biased contact members, the members of each pair defining a slot therebetween, said pairs of said members being disposed in a parallel spaced relationship, said slots being aligned and defining a respective bus receiving aperture means extending from one side to another thereof, each said respective aperture means receiving at least one ribbon of said bus means therethrough defining respective bus portions constrained therewithin to which said respective electrical contact means of said tap member is electrically connected.

12. The electrical tap member of claim 11 wherein said tap includes an additional slot remote from said respective aperture means, said additional slot comprising a bus bypass slot whereby at least one of said plurality of ribbons may extend through said tap member without engaging any of said contact means.

13. An assembly for use in a system for distributing power from a power supply to at least one circuit board, the assembly comprising a bus bar means disposed in a vertical tap;

said bus means comprising relatively thin, substantially flat ribbons arranged in a stacked relationship, each ribbon being adapted to be bent away from the stack to a desired location on the board;

said vertical tap being adapted to receive at least one ribbon, the vertical tap comprising an insulated base and at least one electrical contact means carried by the base, the at least one contact means having respective portions extending above the base and further including an array of contact sections extending below the base for electrical connection to the circuit board; and the portions extending above the base including respective pairs of resiliently-biased electrical contact members, the members of each pair defining a slot therebetween, said pairs of said members being disposed in a parallel relationship with each other and said slots being aligned and defining a bus receiving aperture means for receiving said at least one ribbon, continuously therethrough whereby the at least one ribbon makes an electrical connection with the at least one contact means in the vertical tap; and a cover for being fitted over the contact members and including latch means for latching to cooperating latch means of said base after placement of the bus means through said bus receiving aperture means, said cover including apertures at opposed ends defining exits for said bus means.

14. The assembly of claim 13 wherein said tap member further includes an additional slot remote from said respective aperture means, said additional slot comprising a bus bypass slot, said bypass slot having at least one of said ribbons in said stack extending therethrough.

15. An assembly for use in a system for distributing power from a power supply to at least one circuit board, the assembly comprising a bus bar means disposed in a horizontal tap;

said bus means comprising relatively thin, substantially flat ribbons arranged in a stacked relationship, each ribbon being adapted to be bent away from the stack to a desired location on the board;

said horizontal tap being adapted to receive at least one ribbon, the horizontal tap comprising at least one contact means having a portion thereof bent substantially at right angles thereto so as to be substantially parallel to the board when the horizontal tap is mounted on the board; said contact means including at least one pair of resiliently-biased contact member defining a bus receiving aperture means therebetween for receiving said at least one ribbon continuously therethrough; a plurality of posts anchored on the board; a retention spring locking the posts to the contact means; and a cover fitted over the contact means the covering including latch means for locking one of the bus bar ribbons and the contact together.

* * * * *